(12) United States Patent
Jabber et al.

(10) Patent No.: US 7,971,705 B2
(45) Date of Patent: Jul. 5, 2011

(54) APPARATUS FOR AND METHOD OF SERVICING CONVEYOR BELT RETURN ROLLERS DURING BELT OPERATION

(75) Inventors: Majid Jameel Jabber, Toulon, IL (US); Robert Todd Swinderman, Palm Coast, FL (US)

(73) Assignee: Martin Engineering Company, Neponset, IL (US)

( * ) Notice: Subject to any disclaimer, the term of this patent is extended or adjusted under 35 U.S.C. 154(b) by 202 days.

(21) Appl. No.: 12/234,324

(22) Filed: Sep. 19, 2008

(65) Prior Publication Data

US 2010/0072037 A1    Mar. 25, 2010

(51) Int. Cl.
*B65G 21/10* (2006.01)
*B65G 39/14* (2006.01)

(52) U.S. Cl. .................... 198/830; 198/824; 198/842
(58) Field of Classification Search .............. 198/828, 198/830, 824, 825, 842
See application file for complete search history.

(56) References Cited

U.S. PATENT DOCUMENTS

| | | | |
|---|---|---|---|
| 3,058,574 A | 10/1962 | Gianukos | |
| 3,593,841 A | 7/1971 | Leow | |
| 3,815,724 A * | 6/1974 | Nott | 198/830 |
| 4,109,782 A | 8/1978 | Nakai | |
| 4,749,078 A * | 6/1988 | Mraz | 198/830 |
| 4,938,336 A * | 7/1990 | Aquino et al. | 198/369.2 |
| 5,657,857 A * | 8/1997 | Neilson et al. | 198/861.1 |
| 5,988,361 A * | 11/1999 | Giacomin et al. | 198/830 |
| 6,427,828 B1 * | 8/2002 | East et al. | 198/826 |
| 6,942,085 B1 * | 9/2005 | Tatz | 193/35 R |
| 7,287,642 B1 * | 10/2007 | Carr et al. | 198/861.1 |
| 7,621,391 B2 * | 11/2009 | Matters et al. | 198/825 |
| 2004/0079621 A1 * | 4/2004 | Mott | 198/823 |
| 2007/0284227 A1 | 12/2007 | Hinson | |

FOREIGN PATENT DOCUMENTS

GB    2207408 A *    2/1989

OTHER PUBLICATIONS

Cove Engineering, Smart Frame Idler Changing, http://www.coveng.connionline/Default/asp?DeptID=2457&ArticleID=4215, admitted prior art, 4 pages.
H and B Mining Services, Drop Down Idler, http://www.handbmining.com.au/2008/10/31/drop-down-idler/, admitted prior art, 3 pages.

* cited by examiner

*Primary Examiner* — Mark A Deuble
(74) *Attorney, Agent, or Firm* — Thompson Coburn LLP; Clyde L. Smith (57) ABSTRACT

A method comprises a step of accessing a conveyor belt system that has a belt, a return roller, and a return roller support assembly. The return roller is supported by the return roller support assembly. The return roller is engaged with the belt from beneath the return run. The method also comprises operating the return roller support assembly in a manner causing the return roller to lower relative to the belt to a position where the return roller is no longer engaged with the belt, without requiring any person to reach beneath the belt. The method still further comprises removing the return roller from the return roller support assembly by sliding the return roller out from under the belt after the return roller has been lowered, without requiring any person to reach beneath the belt.

8 Claims, 8 Drawing Sheets

APPARATUS FOR AND METHOD OF SERVICING CONVEYOR BELT RETURN ROLLERS DURING BELT OPERATION

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to bulk material belt conveyor systems. More specifically, this invention pertains to a return roller support assembly that is configured and adapted to allow return rollers to be serviced and removed while a conveyor belt is in operation.

2. General Background Technology

A bulk material belt conveyor comprises a belt that extends in a continuous loop. The upper portion of the continuous loop can be referred to as a transfer run and the lower portion of the continuous loop can be referred to as the return run. On the return run, the belt of a conveyor system is often supported from beneath by return rollers, which are typically idler rollers that roll with the belt. Like all moving components, return rollers occasionally need servicing or replacement. For example, servicing or replacement may be performed when the return rollers no longer rotate with ease, when their bearings get too loose, or when bulk material becomes caked on the rollers. In general, service and replacement of return rollers requires the conveyor belt to be shutdown to allow service personnel reach under the conveyor belt, which the Occupational Safety and Health Administration (OSHA) forbids while a conveyor belt is in operation. Logically, shutting down a conveyor belt system for any purpose decreases the efficiency of the system.

Another drawback associated with servicing return rollers is that the rollers are often fairly heavy and require more than one person to be removed. On conventional structures the return rollers are often mounted below the cat walk and there is almost never access to the far side. This makes service difficult and requires workers to climb in the conveyor structure and use safety harnesses to protect against fatal falls. Alternatively, boom trucks can be used to provide service personnel with access to the service rollers. Nonetheless, return rollers are heavy and bulky and therefore typically require two people to handle.

SUMMARY OF THE INVENTION

The present invention overcomes the disadvantages associated with prior art return roller assemblies by providing apparatus and methods that allow return rollers to be easily serviced or replaced, without requiring the stoppage of conveyor belt systems.

In one aspect of the invention, a method comprises a step of accessing a conveyor belt system. The conveyor belt system comprises a belt, a return roller, and a return roller support assembly. The belt forms a continuous loop having an upper transfer run and a lower return run. The return roller has a weight that is supported by the return roller support assembly. The return roller is engaged with the belt from beneath the return run. The method also comprises a step of operating the return roller support assembly in a manner causing the return roller to lower relative to the belt to a position where the return roller is no longer engaged with the belt. This operation occurs without requiring any person to reach beneath the belt. The method still further comprises a step of removing the return roller from the return roller support assembly by sliding the return roller out from under the belt after the return roller has been lowered as recited. The removal also occurs without requiring any person to reach beneath the belt.

In another aspect of the invention, a conveyor belt system comprises a belt and a return roller assembly. The belt forms a continuous loop having an upper transfer run and a lower return run. The return roller assembly comprises a return roller and a support assembly. The return roller is rotationally mounted about a roller axis relative to the support assembly. The support assembly comprises a fixed portion and pivot portion. The fixed portion is fixed in position relative to the upper transfer run and the lower return run. The pivot portion is pivotally mounted to the fixed portion about a pivot axis. The return roller is removably attached to the fixed portion via the pivot portion in a manner such that the return roller is pivotal with the pivot portion relative to the fixed portion between engaged and disengaged positions. The return roller is engaged with the belt from beneath the return run when the return roller is in the engaged position and is spaced below the belt when the return roller is in the disengaged position. The return roller is also slidably attached to the pivot portion in a manner such that the return roller can be slid out from under the belt and from the support assembly.

Further features and advantages of the present invention, as well as the operation of various embodiments of the present invention, are described in detail below with reference to the accompanying drawings.

Reference numerals in the written specification and in the drawing figures indicate corresponding items.

DETAILED DESCRIPTION OF THE INVENTION

Figure 1:
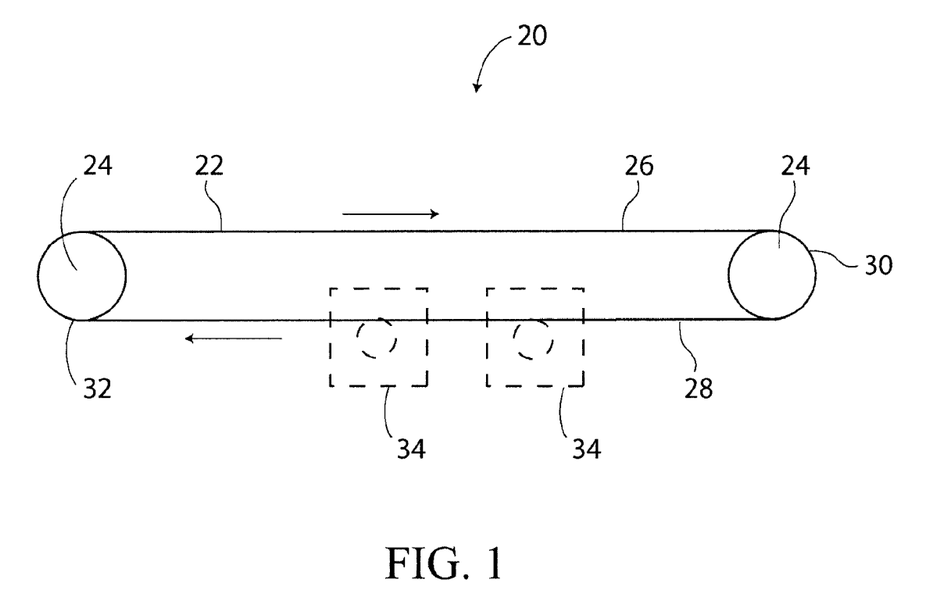
FIG. 1 is a schematic representation of a bulk material conveyor system.
Figure 2:
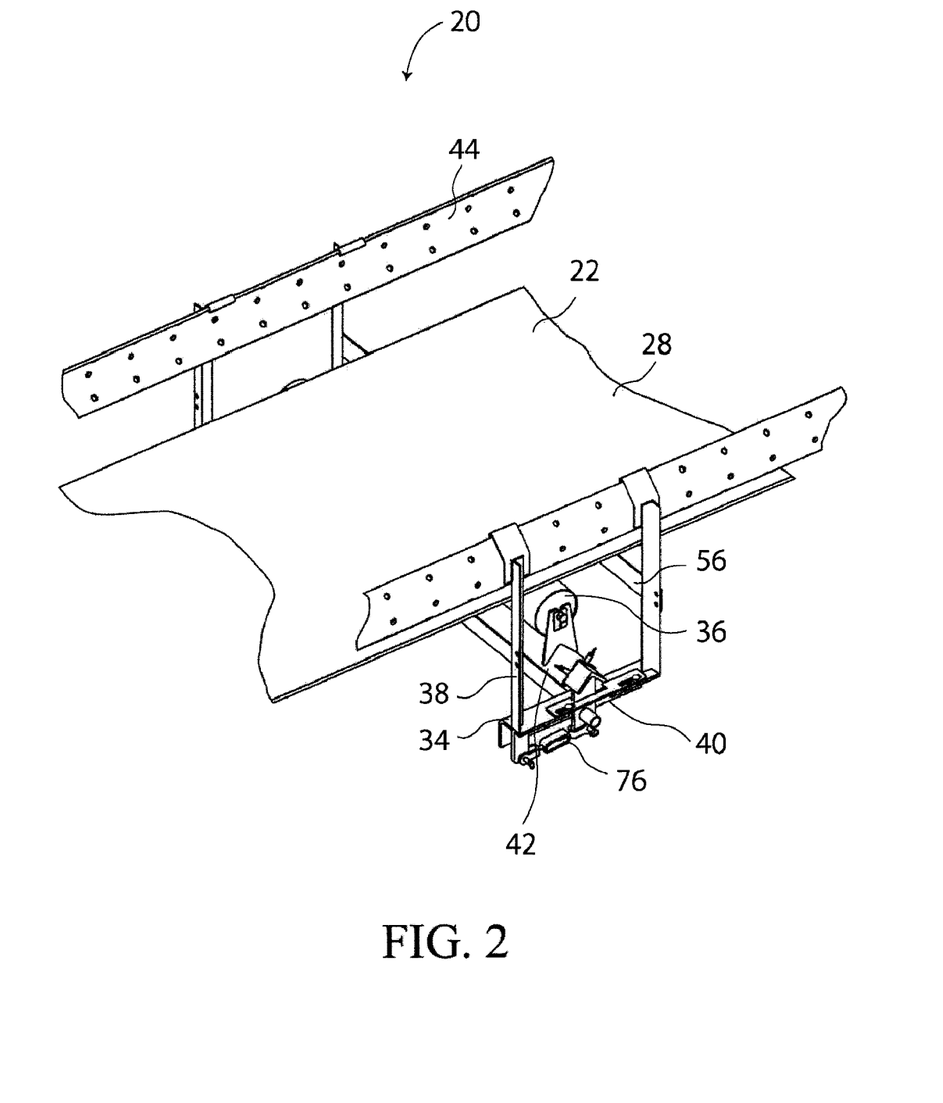
FIG. 2 is a perspective view of a portion of a bulk material conveyor belt system having a return roller assembly in accordance an embodiment of the invention, and is shown with the return roller in its engaged position.
Figure 3:
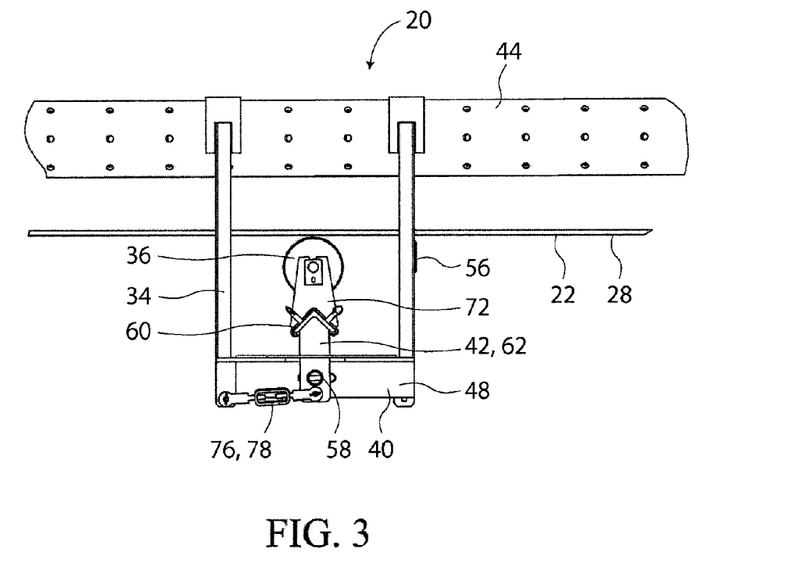
FIG. 3 is a side elevation view of the portion of the bulk material conveyor belt system shown in FIG. 2.
Figure 4:
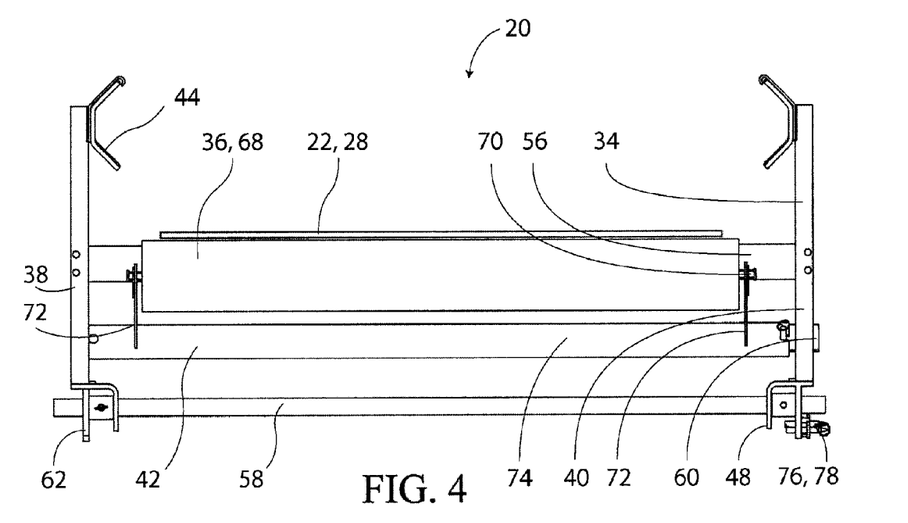
FIG. 4 is an elevation view of the portion of the bulk material conveyor belt system shown in FIGS. 2 and 3, as would be seen looking in a direction parallel to the direction of belt travel.

A bulk material conveyor belt system is shown schematically in FIG. 1. The bulk material conveyor belt system 20 comprises a belt 22 that is driven about rollers 24 and forms a continuous loop. The upper portion of the continuous loop is referred to herein as the transfer run 26 and the lower portion of the continuous loop is referred to herein as the return run 28. It should be appreciated that the direction arrows on FIG. 1 are exemplary of a unidirectional conveyor but that the invention is applicable to reversing conveyors as well. The preferred orientation of the turnbuckle relative to belt travel is the direction which the belt runs most often as shown in FIG. 1 or the direction that the belt runs when the return roller is serviced. The belt 22 generally travels along the return run 28 from the head 30 to the tail 32 of the conveyor (as is depicted with arrows). The bulk material conveyor belt system 20 further comprises one or more return roller assemblies 34 (represented schematically in FIG. 1). The return roller assemblies 34 are configured to support the belt 22 from beneath return run 28.

A portion of the bulk material conveyor belt system 20 having a return roller assembly 34 in accordance a first embodiment of the invention is shown in FIGS. 2-7. The portion of the belt 22 depicted in FIGS. 2-4 lies along the return run 28. The return roller assembly 34 comprises a return roller 36 and a support assembly 38. The support assembly 38 comprises a fixed portion 40 and a pivot portion 42. The fixed portion 40 is stationary relative to the main structural frame 44 of the conveyor belt system 20 is preferably suspended therefrom. The fixed portion 40 preferably comprises a pivot stop member 46 and a cross member 48 on each side of the opposite sides of the conveyor belt system 20, which are located beyond the width of the belt 22 such that they are not positioned directly beneath the belt. Each of the pivot stop members 46 preferably has a pair of slotted bolt openings 50 and is preferably bolted to the respective cross member 48. Each pivot stop member 46 and its respective cross member 48 are configured to created an elongate opening 52. The slotted bolt openings 50 of the pivot stop members 48 allows the positions of the elongate openings 52 to be adjusted slightly along the direction of belt travel by loosening and the tightening the bolts 54. The fixed portion 40 of the support assembly 38 also preferably comprises a pinch guard 56, which is preferably a metal strip, that extends beneath the belt 22 and that is configured to prevent objects from becoming pinched between the belt 22 and the return roller 36. In accordance with safety standards, the pinch guard is preferably adjustable in the vertical plane to maintain a gap of approximately 5 mm between the belt and guard.

The pivot portion 42 of the support assembly 38 comprises a torsion tube 58, a track 60, and a pair of swing arms 62. The torsion tube 58 is pivotally mounted to each of the cross members 48 and is generally oriented horizontally and parallel to the widthwise direction of the belt 22. The swing arms 62 are fixed to and extend radially up from torsion tube 58. The swing arms 62 pass through the elongate openings 52 that are formed by the cross members 48 and the pivot stop members 46. The track 60 is fixed to each of the swings arms 62 and extends generally parallel to the torsion tube 58. For purposes explained below, the swing arms 62 are slightly skewed from being parallel when the torsion tube 58 is not deflected. The track 60 is preferably formed of steel angle iron. A pair of button heads 64 are fixed to the track adjacent one of the longitudinal ends of the track. A pair of removable detent pins 66 are releasably attached to the track 60 adjacent the other longitudinal end of the track.

The return roller 36 comprises a roller body 68, an axle 70, a pair of roller arms 72, and a sleeve member 74. The roller body 68 can be cylindrical (as shown), helical, convex, or any other shape or combination of rollers desired. The roller arms 72 are mounted to opposite ends of the axle 70 in a manner such that the roller body 68 is pivotally connected to the roller arms. The sleeve member 74 preferably extends parallel to the axle 70 and is fixed to each of the roller arms 72. The sleeve member 74 is configured to mate with the track 60 of the pivot portion 42 of the support assembly 38, in a manner securing the return roller 36 to the pivot portion.

Figure 5:
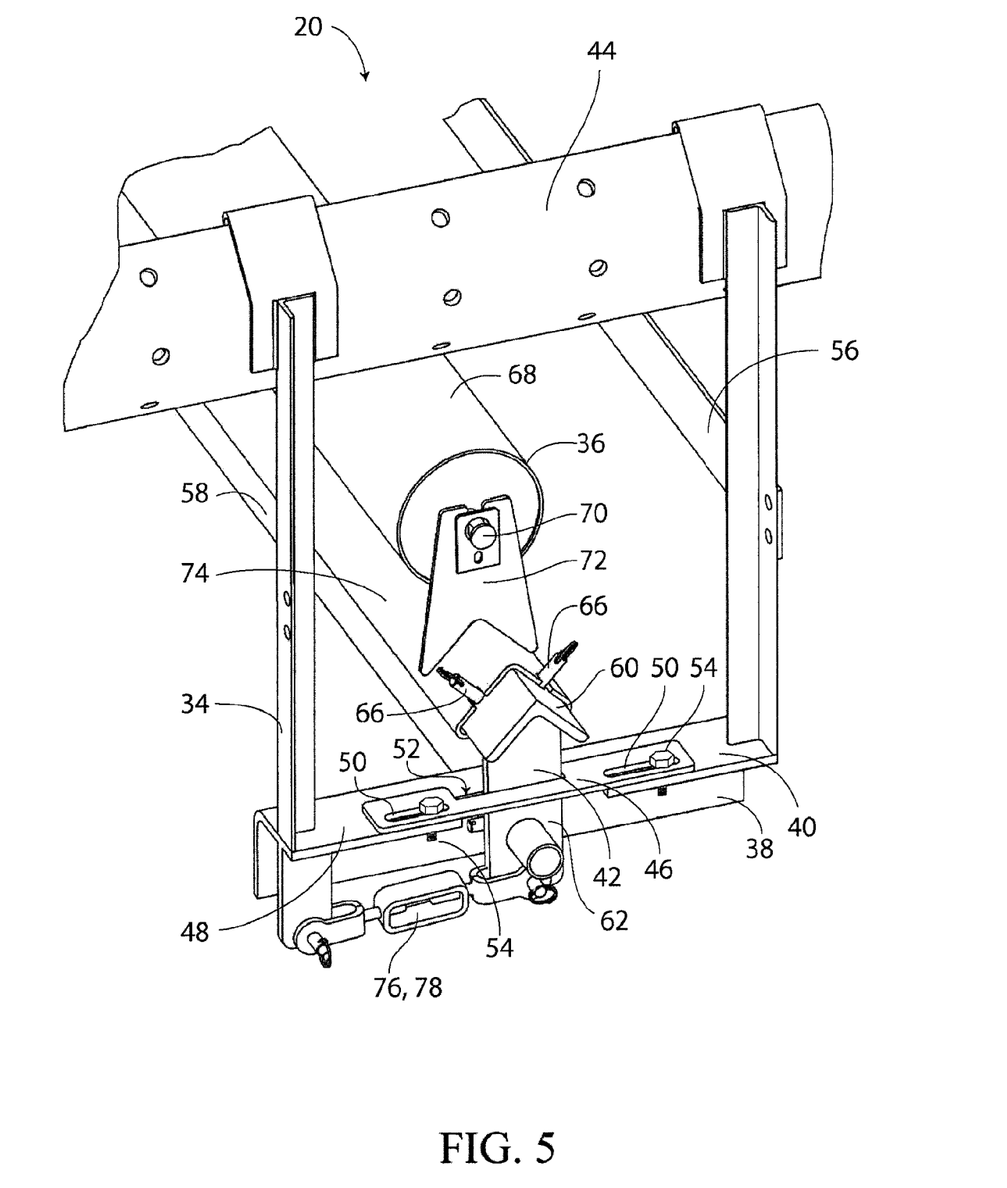
FIG. 5 is a detailed perspective view of the portion of the bulk material conveyor belt system shown in FIGS. 2-4, and is depicted without the belt.
Figure 6:
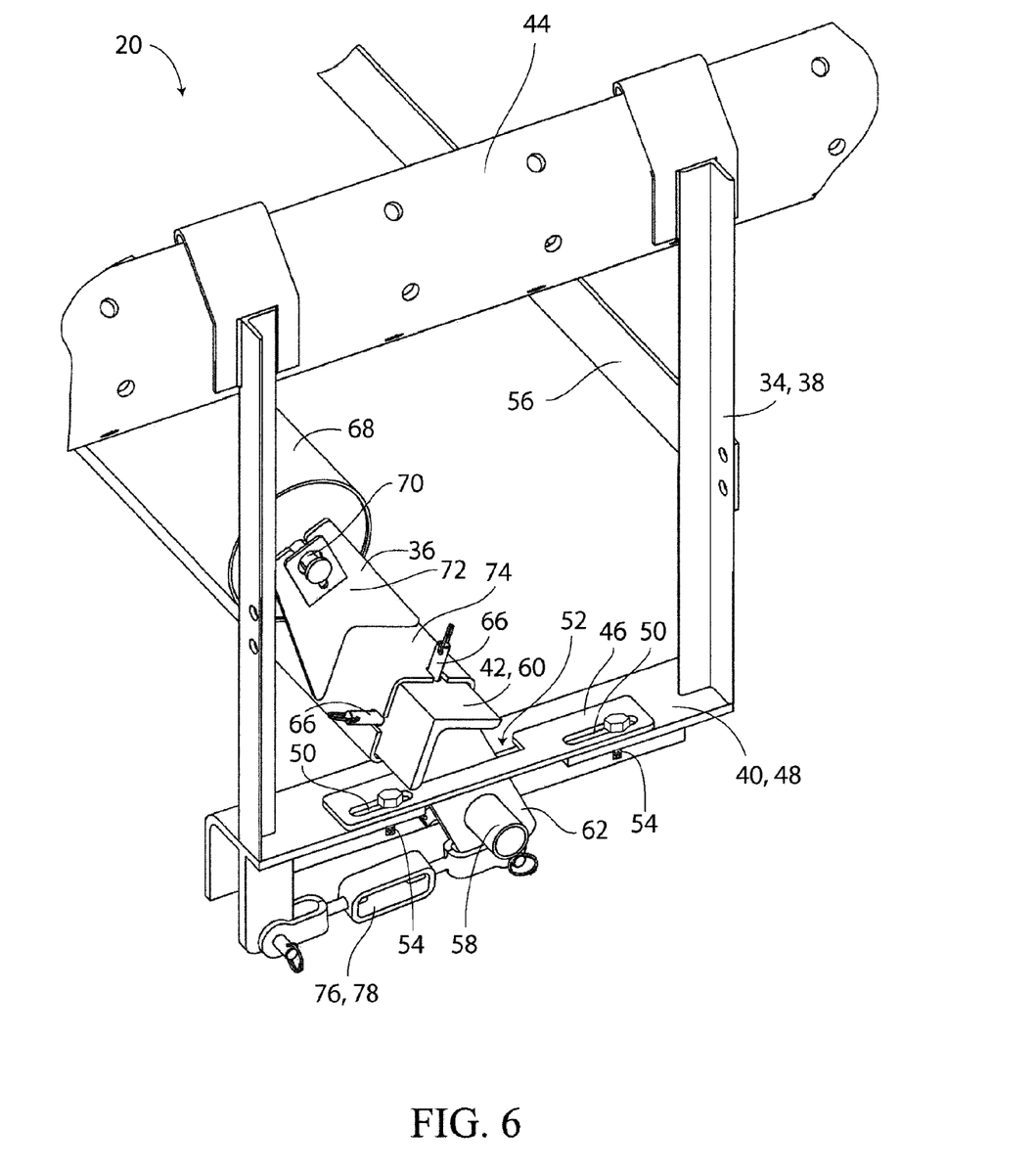
FIG. 6 is a detailed perspective view similar to FIG. 5, but is shown with the return roller in its disengaged position.

The return roller assembly 34 also comprises a pivot mechanism 76 that is connected to both the pivot portion 42 and the fixed portion 40 of the support assembly 38, preferably on the side having the detent pins 66 connected to the track 60. The pivot mechanism 76 comprises a turnbuckle 78 that is pivotally connected to the pivot portion 42 and to the fixed portion 40 of the support assembly 38. The turnbuckle 78 is adjustable in length, which when adjusted allows the pivot portion 42 to pivot relative to the fixed portion 40. However, the pivot stop members 46 of the fixed portion 40 limit the extent to which the pivot portion 42 can pivot in either direction by engaging against the swing arms 62. One limit is shown in FIG. 6 and is referred to herein as the disengagement position. The other limit is shown in FIG. 5 and is referred to herein as the engagement position.

Figure 7:
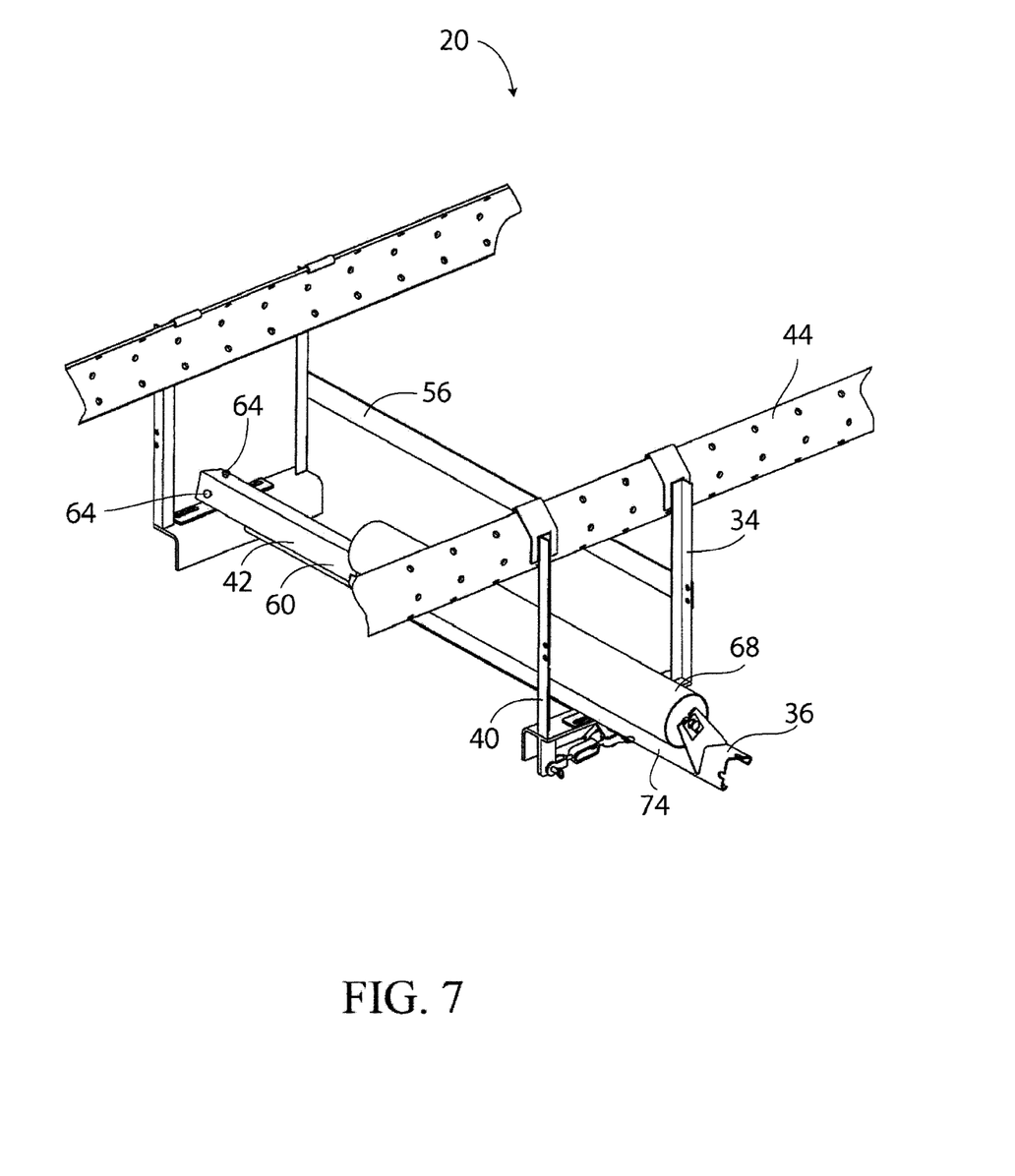
FIG. 7 is a perspective view depicting the removal of the return roller from the portion of the bulk material conveyor belt system shown in FIGS. 2-6, and is depicted without the belt.

The return roller 36 is assembled to the support assembly 38 when the pivot portion 42 is in the disengagement position. The configuration of the support assembly 38 is often dictated by the conveyor design but can be adjustable to facilitate proper location of the assembly below the belt. This is done with the detent pins 66 removed from the track 60. With the detent pins 66 removed, the sleeve member 74 of the return roller 36 is slid onto the track 60, as shown in FIG. 7. The button heads 64 at the opposite end of the track 60 ultimately prevent the sleeve member 74 from sliding along the track beyond a limit. Once this limit is reached, the detent pins 66 are inserted back into the track 60, where they prevent the sleeve member 74 from sliding back off of the track. The turnbuckle 78 of the pivot mechanism 76 is then operated to pivot the pivot portion 42 together with the return roller 36 toward the engagement position. As the pivot portion 42 approaches the engagement position, the swing arm 62 on the side of the conveyor belt system 20 opposite the pivot mechanism 76 contacts its respective pivot stop member 46 before the swing arm on the same side as locking mechanism does. This is due to the swing arms 62 being slightly skewed from each other as mentioned above. The pivot mechanism 76 then torques the torsion tube 58 as the swing arm 62 nearest the pivot mechanism approaches engagement with its respective pivot stop member 46. This resiliently deflects the torsion tube 58 torsionally. Once the swing arm 62 nearest the pivot mechanism 76 engages its respective pivot stop member 46, the pivot portion of the support assembly 38 and the return roller 36 are in the engaged position. It should be appreciated that the torsional deflection of the torsion tube 58 firmly biases the swing arm 62 opposite the pivot mechanism 76 against its respective pivot stop member 46 with sufficient force to resist the tangential forces created by the belt and roller interaction. This eliminates any movement in the system, and thereby ensures that the roller is properly aligned with the belt under normal operating conditions. In prior art systems it, belt flap (vibration at the natural frequency of the belt) can cause the sleeve 74 to chatter on track 60. The clamp bar system of the present invention eliminates slop and prevents such chatter.

In the engaged position, the roller body 68 of the return roller 36 engages the belt 22. When the return roller 36 needs servicing, the above-described process is reversed. To do this, the pivot mechanism 76 is actuated so as to pivot the return roller 36 to the disengaged position. This lowers the return roller 36 and separates the roller body 68 from the belt 22 by a sufficient amount that allows for the removal of the return roller. The sleeve 74 preferably extends the length of the return roller 36 so that the return roller can not accidentally contact the belt when the return roller is being removed during operation of the conveyor belt system. In the disengaged position, the swing arms 62 again engage the pivot stop members 46, which provides confirmation that return roller 36 has been sufficiently lowered. In the event that there is slack in the belt 22, the pinch guard 56 will engage the belt and ensure that that the belt remains sufficiently spaced from the return roller 36. In the disengaged position, the detent pins 66 can then be removed, thereby allowing the return roller 36 to be slid off the track 60. The return roller 36 can then be repaired or replaced. It should be appreciated that the assembly can be guarded with a barrier guard such as a wire mesh screen. In such situations, an opening can be provided in the guard such that the return roller 36 can only be withdrawn when in the disengaged position. Preferably, such an access opening would require a tool for opening so that non-authorized personnel cannot easily attempt to service the return roller.

Figure 8:
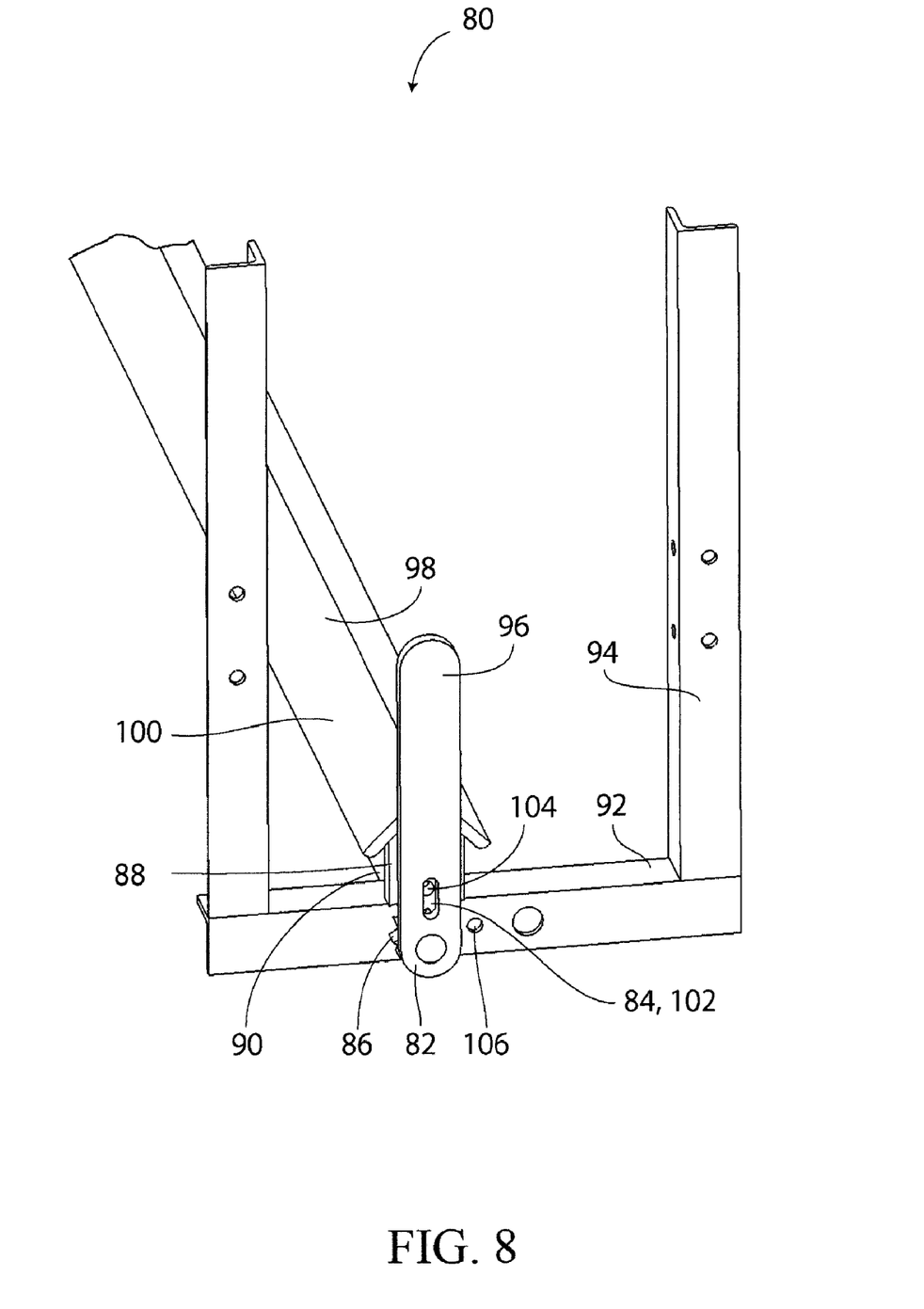
FIG. 8 is a detailed perspective view of an alternative embodiment of a return roller support assembly in accordance with the invention, and is shown with the return roller in its engaged position.
Figure 9:
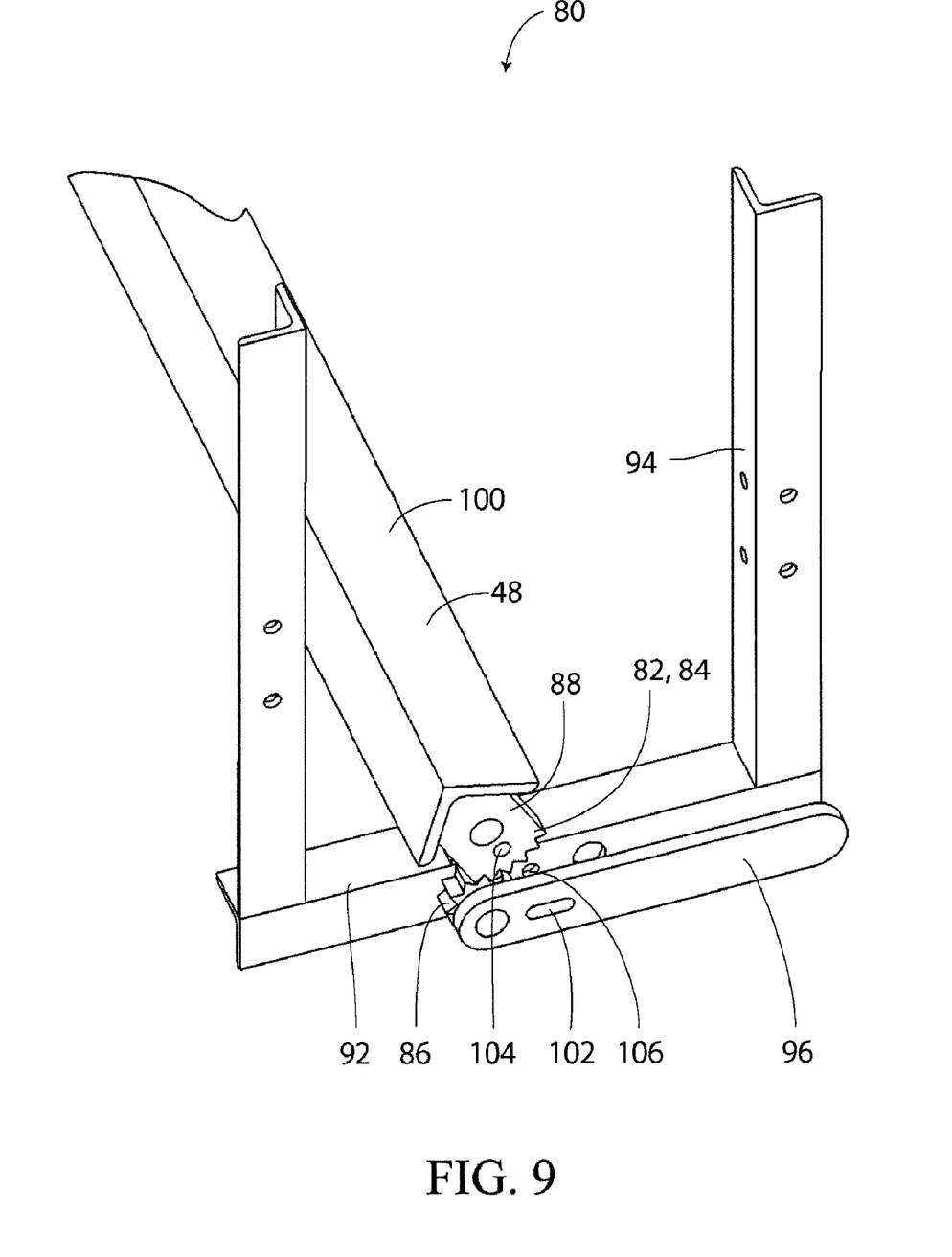
FIG. 9 is a view similar to FIG. 8, but is shown with the return roller in its disengaged position.

An alternative embodiment of a return roller support assembly in accordance with the invention is shown in FIGS. 8 and 9. This alternative support assembly 80 differs primarily in that its pivot mechanism 82 comprises gears rather than a turnbuckle. More specifically, the support assembly 80 comprises a first toothed gear 84 and a second toothed gear 86. The first toothed gear 84 is formed as part of one of the swing arms 88 and is attached to the end of the torsion tube 90 in a manner such that it is aligned with the pivot axis thereof. The second toothed gear 86 is pivotally mounted to the cross member 92 of the fixed portion 94 of the support assembly 80 and is engaged with the first toothed gear 84. A lever arm 96 is attached to the second toothed gear 86 for rotation therewith. When the pivot portion 98 of the support assembly 80 is in the engaged position (shown in FIG. 8), the lever arm 96 extends vertically upwards, where it can act in place of the above-described detent pins to prevent the return roller (not shown) from backing off of the track 100 of the pivot portion 98 and prevent service while the roller is in the engaged position. The pivot portion 98 can be moved to the disengaged position by pivoting the lever arm 96 to the position shown in FIG. 9. To maintain the pivot portion 98 of the support assembly 80 in either the engaged or disengaged positions, the lever arm 96 comprises a slot 102 that is adapted to receive a detent pin (not shown). In the engaged position, the slot 102 is aligned with a detent hole 104 that is formed in the swing arm 88. In the disengaged position, the slot 102 is aligned with a detent hole 106 that is formed in the cross member 92. In either case, a detent pin can be placed through the slot 102 and corresponding detent hole 104, 106 to prevent the lever arm 96 from pivoting.

In view of the foregoing, it should be appreciated that the invention achieves the several advantages over prior art methods and devices. It should also be appreciated that the invention allows return rollers to be serviced or replaced while a conveyor belt system is in operation. Still further, it should be appreciated that the invention allows return rollers to be replaced or serviced easily from just one side of a conveyor belt system and the system can be made to work on the right or left hand of the conveyor by the addition of a second pivot mechanism attachment opposite the one shown in the drawings.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A method comprising:
    accessing a conveyor belt system, the conveyor belt system comprising a belt, a return roller, and a return roller support assembly, the belt forming a continuous loop having an upper transfer run and a lower return run, the return roller having a weight that is supported by the return roller support assembly, the return roller being engaged with the belt from beneath the return run and being configured to revolve about a roller axis, the return roller support assembly comprising a pivot mechanism that is configured to selectively swing the return roller about a pivot axis that is spaced from the roller axis, the pivot mechanism comprising a threaded member;
    operating the return roller support assembly in a manner causing the return roller to lower relative to the belt to a position where the return roller is no longer engaged with the belt using the threaded member to cause the pivot mechanism to swing the return roller about the pivot axis, the operating occurring without requiring any person to reach beneath the belt;
    removing the return roller from the return roller support assembly by sliding the return roller out from under the belt after the return roller has been lowered as recited, the removing occurring without requiring any person to reach beneath the belt.

2. A method comprising:
    accessing a conveyor belt system, the conveyor belt system comprising a belt, a return roller, and a return roller support assembly, the belt forming a continuous loop having an upper transfer run and a lower return run, the return roller having a weight that is supported by the return roller support assembly, the return roller being engaged with the belt from beneath the return run and being configured to revolve about a roller axis, the return roller support assembly comprising a pivot mechanism that is configured to selectively swing the return roller about a pivot axis that is spaced from the roller axis, the pivot mechanism comprising first and second gear members, the first gear member being aligned with the pivot axis and pivotable together with the return roller about the pivot axis, the second gear member being engaged with the first gear member;

operating the return roller support assembly in a manner causing the return roller to lower relative to the belt to a position where the return roller is no longer engaged with the belt by pivoting the second gear member in a manner causing the first gear member to pivot about the pivot axis to cause the pivot mechanism to swing the return roller about the pivot axis, the operating occurring without requiring any person to reach beneath the belt;

removing the return roller from the return roller support assembly by sliding the return roller out from under the belt after the return roller has been lowered as recited, the removing occurring without requiring any person to reach beneath the belt.

3. A conveyor belt system comprising:

a belt, the belt forming a continuous loop having an upper transfer run and a lower return run;

a return roller assembly, the return roller assembly comprising a return roller and a support assembly, the return roller being rotationally mounted about a roller axis relative to the support assembly, the support assembly comprising a fixed portion and pivot portion, the fixed portion being fixed in position relative to the upper transfer run and the lower return run, the pivot portion being pivotally mounted to the fixed portion about a pivot axis, the return roller being removably attached to the fixed portion via the pivot portion in a manner such that the return roller is pivotal with the pivot portion relative to the fixed portion between engaged and disengaged positions, the return roller being engaged with the belt from beneath the return run when the return roller is in the engaged position, the return roller being spaced below the belt when the return roller is in the disengaged position, the return roller being slidably attached to the pivot portion in a manner such that the return roller can be slid out from under the belt and from the support assembly, the support assembly comprising a threaded link portion, the threaded link portion being attached to the pivot portion and the fixed portion in a manner such that the threaded link portion can selectively lock the return roller in each of the engaged and disengaged positions.

4. A conveyor belt system comprising:

a belt, the belt forming a continuous loop having an upper transfer run and a lower return run;

a return roller assembly, the return roller assembly comprising a return roller and a support assembly, the return roller being rotationally mounted about a roller axis relative to the support assembly, the support assembly comprising a fixed portion and pivot portion, the fixed portion being fixed in position relative to the upper transfer run and the lower return run, the pivot portion being pivotally mounted to the fixed portion about a pivot axis, the return roller being removably attached to the fixed portion via the pivot portion in a manner such that the return roller is pivotal with the pivot portion relative to the fixed portion between engaged and disengaged positions, the return roller being engaged with the belt from beneath the return run when the return roller is in the engaged position, the return roller being spaced below the belt when the return roller is in the disengaged position, the return roller being slidably attached to the pivot portion in a manner such that the return roller can be slid out from under the belt and from the support assembly, the support assembly further comprising first and second gear members, the first and second gear members being engaged with each other, the first gear member being aligned with the pivot axis and pivotable together with the return roller about the pivot axis, the second gear member is being pivotable about a gear axis relative to the fixed portion of the support assembly, the gear axis being fixed in position relative to the fixed portion of the support assembly, and the first and second gear members being configured such that pivoting the second gear member about the gear axis causes the pivot portion to pivot about the pivot axis relative to the fixed portion.

5. A conveyor belt system in accordance with claim 4 wherein the support assembly further comprises a lever arm, the lever arm being fixed to the second gear member in a manner such that the lever arm pivots with the second gear member about the gear axis, and the lever arm prevents the return roller from being removed from the pivot portion of the support assembly when the return roller is in the engaged position.

6. A conveyor belt system comprising:

a belt, the belt forming a continuous loop having an upper transfer run and a lower return run;

a return roller assembly, the return roller assembly comprising a return roller and a support assembly, the return roller being rotationally mounted about a roller axis relative to the support assembly, the support assembly comprising a fixed portion and pivot portion, the fixed portion being fixed in position relative to the upper transfer run and the lower return run, the pivot portion being pivotally mounted to the fixed portion about a pivot axis, the return roller being removably attached to the fixed portion via the pivot portion in a manner such that the return roller is pivotal with the pivot portion relative to the fixed portion between engaged and disengaged positions, the return roller being engaged with the belt from beneath the return run when the return roller is in the engaged position, the return roller being spaced below the belt when the return roller is in the disengaged position, the return roller being slidably attached to the pivot portion in a manner such that the return roller can be slid out from under the belt and from the support assembly, the pivot portion of the support assembly comprising a torsion member and first and second swing arms, the first and second swing arms extending from the torsion member and being spaced from each other, the fixed portion of the support assembly comprising first and second pivot stop members, the first pivot stop member being engageable with the first swing arm in a manner limiting the first swing arm from pivoting in a first direction beyond a set point, the second pivot stop member being engageable with the second swing arm in a manner limiting the second swing arm from pivoting in the first direction beyond a set point, the first and second swing arms being at their respective set points when the return roller is in engaged position, and the torsion tube being resiliently deflected torsionally when the first and second swing arms are at their respective set points.

7. A conveyor belt system in accordance with claim 6 wherein the first and second pivot stop members are each adjustable in a manner allowing the respective set points to be adjusted.

8. A conveyor belt system in accordance with claim 6 wherein the pivot portion of the support assembly comprises a track member, a stop member, and a release member, the return roller is removably mounted to the track by sliding the return roller along the track, the stop member limits the return roller from sliding in a first direction along the track beyond a particular point, and the release member is movable relative to the track member in a manner such that the release member can selectively limit the return roller from sliding along the track in the opposite direction beyond a particular point.

* * * * *